US011770201B2

(12) United States Patent
Ogawa et al.

(10) Patent No.: US 11,770,201 B2
(45) Date of Patent: *Sep. 26, 2023

(54) TERMINAL APPARATUS AND SEQUENCE ASSIGNING METHOD

(71) Applicant: Panasonic Corporation, Osaka (JP)

(72) Inventors: Yoshihiko Ogawa, Kanagawa (JP); Daichi Imamura, Kanagawa (JP); Sadaki Futagi, Ishikawa (JP); Tomofumi Takata, Ishikawa (JP)

(73) Assignee: Panasonic Holdings Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/511,256

(22) Filed: Oct. 26, 2021

(65) Prior Publication Data
US 2022/0052776 A1 Feb. 17, 2022

Related U.S. Application Data

(63) Continuation of application No. 16/913,665, filed on Jun. 26, 2020, now Pat. No. 11,190,290, which is a
(Continued)

(30) Foreign Application Priority Data

Oct. 2, 2006 (JP) .................................. 2006-271051

(51) Int. Cl.
*H04J 11/00* (2006.01)
*H04J 13/00* (2011.01)
(Continued)

(52) U.S. Cl.
CPC ............ *H04J 13/0062* (2013.01); *H04B 1/38* (2013.01); *H04J 11/005* (2013.01); *H04J 13/22* (2013.01);
(Continued)

(58) Field of Classification Search
CPC ..... H04B 1/38; H04L 27/2602; H04L 5/0048; H04L 43/16; H04L 5/0073; H04J 11/005;
(Continued)

(56) References Cited

U.S. PATENT DOCUMENTS 7,444,515 B2 10/2008 Dharmapurikar et al.
7,583,586 B2 9/2009 Park et al.
(Continued)

FOREIGN PATENT DOCUMENTS

JP 2007-300316 A 11/2007

OTHER PUBLICATIONS

Extended European Search Report, dated Oct. 4, 2011, for European Application No. 11174841.4, 8 pages.
(Continued)

*Primary Examiner* — Aristocratis Fotakis
(74) *Attorney, Agent, or Firm* — Seed IP Law Group LLP

(57) ABSTRACT

Provided is a sequence allocation method capable of reducing inter-cell interference of a reference signal when a ZC sequence is used as the reference signal in a mobile communication system. In the sequence allocation method, R×M sequences specified by a ZC sequence number r (r=1 to R) and a cyclic shift sequence number m (m=1 to M) are divided into a plurality of sequence groups X (X=1 to R) in accordance with the transmission band width of the reference signal, so that the ZC sequence is allocated to each cell in each sequence group unit. When it is assumed that R=9 and M=6, the number of sequences is 54. Each of the sequence groups is formed by two sequences. Accordingly, the number of sequence groups is 27. The 27 types of sequence groups are allocated to each cell.

22 Claims, 11 Drawing Sheets

Related U.S. Application Data continuation of application No. 15/356,236, filed on Nov. 18, 2016, now Pat. No. 10,742,344, which is a continuation of application No. 15/182,523, filed on Jun. 14, 2016, now Pat. No. 9,912,432, which is a continuation of application No. 14/727,481, filed on Jun. 1, 2015, now Pat. No. 9,391,757, which is a continuation of application No. 14/558,565, filed on Dec. 2, 2014, now Pat. No. 9,077,595, which is a continuation of application No. 13/610,665, filed on Sep. 11, 2012, now Pat. No. 8,937,915, which is a continuation of application No. 13/411,269, filed on Mar. 2, 2012, now Pat. No. 8,290,502, which is a continuation of application No. 12/969,425, filed on Dec. 15, 2010, now Pat. No. 8,155,656, which is a continuation of application No. 12/443,940, filed as application No. PCT/JP2007/069304 on Oct. 2, 2007, now Pat. No. 7,995,614.

(51) Int. Cl.

| | | |
|---|---|---|
| *H04J 13/22* | (2011.01) | |
| *H04W 16/10* | (2009.01) | |
| *H04B 1/38* | (2015.01) | |
| *H04L 27/26* | (2006.01) | |
| *H04L 5/00* | (2006.01) | |
| *H04W 72/04* | (2023.01) | |
| *H04L 12/26* | (2006.01) | |
| *H04W 72/23* | (2023.01) | |
| *H04L 43/16* | (2022.01) | |

(52) U.S. Cl.
CPC .......... *H04L 5/0048* (2013.01); *H04L 5/0073* (2013.01); *H04L 43/16* (2013.01); *H04W 16/10* (2013.01); *H04W 72/23* (2023.01)

(58) Field of Classification Search
CPC ... H04J 13/0062; H04J 13/22; H04W 72/042; H04W 16/10
See application file for complete search history.

(56) References Cited

U.S. PATENT DOCUMENTS

| | | | |
|---|---|---|---|
| 7,660,282 | B2 | 2/2010 | Sarkar |
| 7,706,249 | B2 | 4/2010 | Akita et al. |
| 8,780,690 | B2 | 7/2014 | Akita et al. |
| 2005/0086520 | A1 | 4/2005 | Dharmapurikar et al. |
| 2006/0050799 | A1 | 3/2006 | Hou et al. |
| 2006/0056528 | A1 | 3/2006 | Jung et al. |
| 2006/0132302 | A1 | 6/2006 | Stilp |
| 2007/0073805 | A1 | 3/2007 | Jorgensen |
| 2007/0140106 | A1 | 6/2007 | Tsai et al. |
| 2007/0149227 | A1 | 6/2007 | Parizhsky et al. |
| 2007/0171995 | A1 | 7/2007 | Muharemovic et al. |
| 2007/0177682 | A1 | 8/2007 | Han et al. |
| 2007/0183306 | A1 | 8/2007 | Akita et al. |
| 2007/0230600 | A1 | 10/2007 | Bertrand et al. |
| 2007/0253465 | A1 | 11/2007 | Muharemovic et al. |
| 2007/0254685 | A1 | 11/2007 | Oketani et al. |
| 2008/0049708 | A1 | 2/2008 | Khan et al. |
| 2008/0123616 | A1 | 5/2008 | Lee |
| 2008/0232432 | A1 | 9/2008 | Lee et al. |
| 2008/0273582 | A1* | 11/2008 | Gaal ................. H04L 25/0226 375/224 |
| 2009/0080500 | A1* | 3/2009 | Muharemovic ... H04W 72/0453 375/E1.002 |
| 2009/0303960 | A1* | 12/2009 | Qu ..................... H04J 13/0059 370/330 |
| 2011/0249549 | A1* | 10/2011 | Hao ....................... H04J 13/16 370/208 |

OTHER PUBLICATIONS

"Group-wised Frequency Resource Allocation for Frequency Domain Channel-dependent Scheduling in SC-Based E-UTRA Uplink," R1-062104, 3rd Generation Partnership Project (3GPP™) TSG RAN WG1 Meeting #46, Tallinn, Estonia, Aug. 28-Sep. 1, 2006, pp. 1-13.

International Search Report, dated Jan. 22, 2008, for International Application No. PCT/JP2007/069304, 2 pages.

"Multiplexing Method for Orthogonal Reference Signals for E-UTRA Uplink," Agenda Item: 8.4.2, R1-062101 (Original R1-061193), Source: NTT DoCoMo, Ericsson, Fujitsu, KDDI, LG Electronics, Mitsubishi Electric, NEC, Panasonic, Sharp, Toshiba Corporation, 3GPP TSG RAN WG1 Meeting #46, Tallinn, Estonia, Aug. 28-Sep. 1, 2006, pp. 1-13.

NTT DoCoMo, Sharp, Toshiba Corporation, "Pilot Sequence Allocation Method in E-UTRA Uplink," R1-061678, 3GPP TSG RAN WG1 LTE Ad Hoc, Cannes, Frances, Jun. 27-30, 2006, 6 pages.

NTT DoCoMo, Ericsson, Fujitsu, Mitsubishi Electric, NEC, Panasonic, Sharp, Toshiba Corporation, "Multiplexing Method for Orthogonal Reference Signals for E-UTRA Uplink," R1-061676, 3GPP TSG RAN WG1 LTE Ad Hoc, Cannes, France, Jun. 27-30, 2006, 13 pages.

Panasonic, NTT DoCoMo, "Narrow band uplink reference sequences and allocation for E-UTRA," R1-063183, Agenda Item: 6.4.2, TSG-RAN WG1 Meeting #47, Riga, Latvia, Nov. 6-10, 2006, pp. 1-4.

Panasonic, NTT DoCoMo, "Random access burst design for E-UTRA," R1-062175, Agenda Item: 8.3.1, TSG-RAN WG1 Meeting #46, Tallinn, Estonia, Aug. 28-Sep. 1, 2006, 9 pages.

"Pilot Sequence Allocation Method in E-UTRA Uplink," Agenda Item: 8.4.2, R1-062103 (Original R1-061678), Source: NTT DoCoMo, Mitsubishi Electric, Panasonic, Sharp, Toshiba Corporation, 3GPP TSG RAN WG1 Meeting #46, Tallinn, Estonia, Aug. 28-Sep. 1, 2006, pp. 1-6.

"Uplink Reference Signal Mulitplexing Structures for E-UTRA," Agenda Item: 6.5.2, R1-062610, 3GPP TSG RAN1#46bis, Seoul, Korea, Oct. 9-13, 2006, pp. 1-16.

"Uplink Reference Signal Multiplexing Structures for E-UTRA," Agenda Item: 8.4.2, R1-062072, 3GPP TSG RAN1#46, Tallinn, Estonia, Aug. 28-Sep. 1, 2006, pp. 1-10.

* cited by examiner

| VIRTUAL SEQUENCE GROUP (X) | SEQUENCE NUMBER (r) | CYCLIC SHIFT SEQUENCE NUMBER (m) | VIRTUAL SEQUENCE NUMBER (Z) |
|---|---|---|---|
| 1 | 1 | 1~6 | 1~6 |
| 2 | 2 | 1~6 | 7~12 |
| 3 | 3 | 1~6 | 13~18 |
| 4 | 4 | 1~6 | 19~24 |
| ⋮ | ⋮ | ⋮ | ⋮ |
| R-1 | R-1 | 1~6 | 6R-11~ 6R-6 |
| R | R | 1~6 | 6R-5~6R |

FIG.3

| VIRTUAL SEQUENCE GROUP (X) | SEQUENCE NUMBER (r) | CYCLIC SHIFT SEQUENCE NUMBER (m) | VIRTUAL SEQUENCE NUMBER (Z) |
|---|---|---|---|
| 1 | 1 | 1~2 | 1~2 |
| 2 | 1 | 3~4 | 3~4 |
| 3 | 1 | 5~6 | 5~6 |
| 4 | 2 | 1~2 | 7~8 |
| 5 | 2 | 3~4 | 9~10 |
| ⋮ | ⋮ | ⋮ | ⋮ |
| 3R-1 | R | 3~4 | 6R-3~ 6R-2 |
| 3R | R | 5~6 | 6R-1~6R |

TERMINAL APPARATUS AND SEQUENCE ASSIGNING METHOD

BACKGROUND

Technical Field

The present invention relates to a sequence assignment method in mobile communication systems. More particularly, the present invention relates to a sequence assignment method of assigning a CAZAC (Constant Amplitude Zero Auto-Correlation) sequence to cells in a case of using a CAZAC sequence for an uplink reference signal.

Description of the Related Art

In 3GPP LTE (3rd Generation Partnership Project Long-term Evolution), studies are underway to use a CAZAC sequence such as a Zadoff-Chu sequence (hereinafter simply "ZC sequence") and a generalized chirp-like sequence (hereinafter simply "GCL sequence") as an uplink reference signal. A ZC sequence, which has especially good cross-correlation characteristics among CAZAC sequences, becomes a focus of attention.

A ZC sequence is represented by the following equation 1. Here, N is the sequence length and r is the sequence number. N and r are coprime.

[1]
$$c_r(k) = \begin{cases} \exp\left(j\frac{2\pi r}{N}\left(k + \frac{k^2}{2}\right)\right) & \text{when } N \text{ is even} \\ \exp\left(j\frac{2\pi r}{N}\left(k + k\frac{k+1}{2}\right)\right) & \text{when } N \text{ is odd} \end{cases}$$ (Equation 1)

$$k = 0, 1, \ldots, N-1$$

With regards to ZC sequence, if the sequence length N is a prime number, N−1 sequences of good cross-correlation characteristics can be generated. At this time, the cross-correlation between sequences is $\sqrt{N}$ and fixed. For example, the cross-correlation between the ZC sequence of sequence number r=1 and the ZC sequence of sequence number r=5 that are different sequence numbers, is $\sqrt{N}$ and fixed. On the other hand, if the sequence length N is a number other than prime numbers and if the absolute value of the difference between two sequence numbers is not coprime to N, the maximum value of cross-correlation between these two sequences is greater than $\sqrt{N}$.

Further, with regards to a ZC sequence, it is possible to generate, from one sequence, a plurality of cyclic shift sequences shifted m times the amount of cyclic shift 6 (hereinafter the cyclic shift sequence number is m.) Then, autocorrelation is ideally zero in all cyclic shift sequences other than the cyclic shift sequence, which the amount of shift is zero.

Here, the amount of cyclic shift A is designed based on delay spread. This is because, if delay spread exceeds the amount of cyclic shift A, a detection error occurs in the base station by detecting a correlation value between cyclic shift sequences of different amounts of cyclic shifts within the range of a delay profile detection window set in association with m times the amount of cyclic shift Δ.

Further, the transmission time length L of a reference signal is set to a given length, and therefore the number of cyclic shift sequences M that can be generated from one ZC sequence is limited, and the following equation 2 holds.

[2]

$$M = L/\Delta$$ (Equation 2)

As a method of assigning a ZC sequence to cells in cases where a ZC sequence having these characteristics is used as a reference signal, studies are conducted for assigning different ZC sequences to neighboring cells and assigning M cyclic shift sequences that can be generated from one ZC sequence in a cell (see Non-Patent Document 1). FIG. 1 shows this conventional assignment method. Here, ZC sequences of different sequence numbers (r=1 to 21) are assigned to cells, and cyclic shift sequences (m=1 to 6) are used in each cell. Here, each cell corresponds to a radio service area. That is, in cases where one base station provides communication service for a plurality of radio service areas, a plurality of cells belong to one base station. When a plurality of cells belong to one base station, a plurality of cells each may be referred to as a "sector." The same applies to the following explanation.

In this way, by assigning ZC sequences having low cross-correlations and having different sequence numbers to neighboring cells, it is possible to reduce inter-cell interference. Further, by using cyclic shift sequences having good autocorrelation characteristics in the same cell, it is possible to reduce interference between mobile stations in the cell and perform accurate channel estimation. The effect of reducing interference by a plurality of cyclic shift sequences generated from one ZC sequence is greater than by a plurality of cyclic shift sequences of different sequence numbers.

Non-patent Document 1: R1-062072, MOTOROLA, "Uplink Reference Signal Multiplexing Structures for E-UTRA," 3GPP TSG RAN WG1 Meeting #46, Aug. 28-Sep. 1, 2006

BRIEF SUMMARY

Problems to be Solved by the Invention

Here, the number of ZC sequences is limited, and therefore it is necessary to reuse a ZC sequence having the same sequence number as a ZC sequence assigned to a cell in different cells. For example, in cases where ZC sequences of the same sequence number is assigned to two neighboring cells, the base station cannot identify which a reference signal is transmitted from a mobile station in one of cells, and consequently, an error occurs in the channel estimation result. That is, in cases where ZC sequences of the same sequence number are assigned to a plurality of cells, it is necessary to arrange a plurality of cells distant from each other, to prevent inter-cell interference.

On the other hand, the maximum transmission power of a mobile station is limited in uplink, and therefore, when the cell radius is long, to obtain the accuracy of desired channel estimation, it is necessary to transmit a reference signal and data in narrowband (e.g., 360 kHz). If the transmission time length of a reference signal does not change, the sequence length N of a ZC sequence that can be used as a reference signal is shorter when a transmission bandwidth is narrower. Accordingly, the number of ZC sequences that can be assigned to cells decreases. For example, assuming a 360 kHz transmission bandwidth and a 30 kHz subcarrier bandwidth, ZC sequence length N is 12 (11 if N is a prime number).

Here, FIG. 2 shows the assignment pattern if the number of ZC sequences is nine (r=1 to 9). If the number of ZC sequences is small like this, ZC sequences that can be assigned to cells decreases, and therefore ZC sequences of the same sequence number have to be assigned to a plurality of relatively nearby cells. As a result, interfering a reference signal increases between the nearby cells.

It is therefore an object of the present invention to provide a sequence assignment method that can reduce inter-cell interference of reference signals in mobile communication systems.

Means for Solving the Problem

The present invention where a Zadoff-Chu sequence is used as a reference signal includes: grouping R×M sequences specified by Zadoff-Chu sequence numbers r (r=1 to R) and the cyclic shift sequence numbers m (m=1 to M) into a plurality of sequence groups according to transmission bandwidths for reference signals; and assigning a plurality of sequences belonging to a same group to one cell.

Advantageous Effect of the Invention

According to the present invention, ZC sequences are grouped into a plurality of sequence groups according to transmission bandwidth for reference signals, so that it is possible to increase the number of sequence groups by reducing the number of sequences included in a sequence groups. Consequently, even in cases where reference signals are transmitted in narrow bands, it is possible to determine a sequence group assigned to a cell from a large number of sequence groups and reduce interference between different cells.

BRIEF DESCRIPTION OF THE SEVERAL VIEWS OF THE DRAWINGS

FIG. 3 shows the virtual sequence groups (in cases where the number according to transmission bandwidths is six), according to Embodiment 1;

FIG. 4 shows the virtual sequence groups (in cases where the number according to transmission bandwidths is two), according to Embodiment 1;

DETAILED DESCRIPTION

Figure 1:
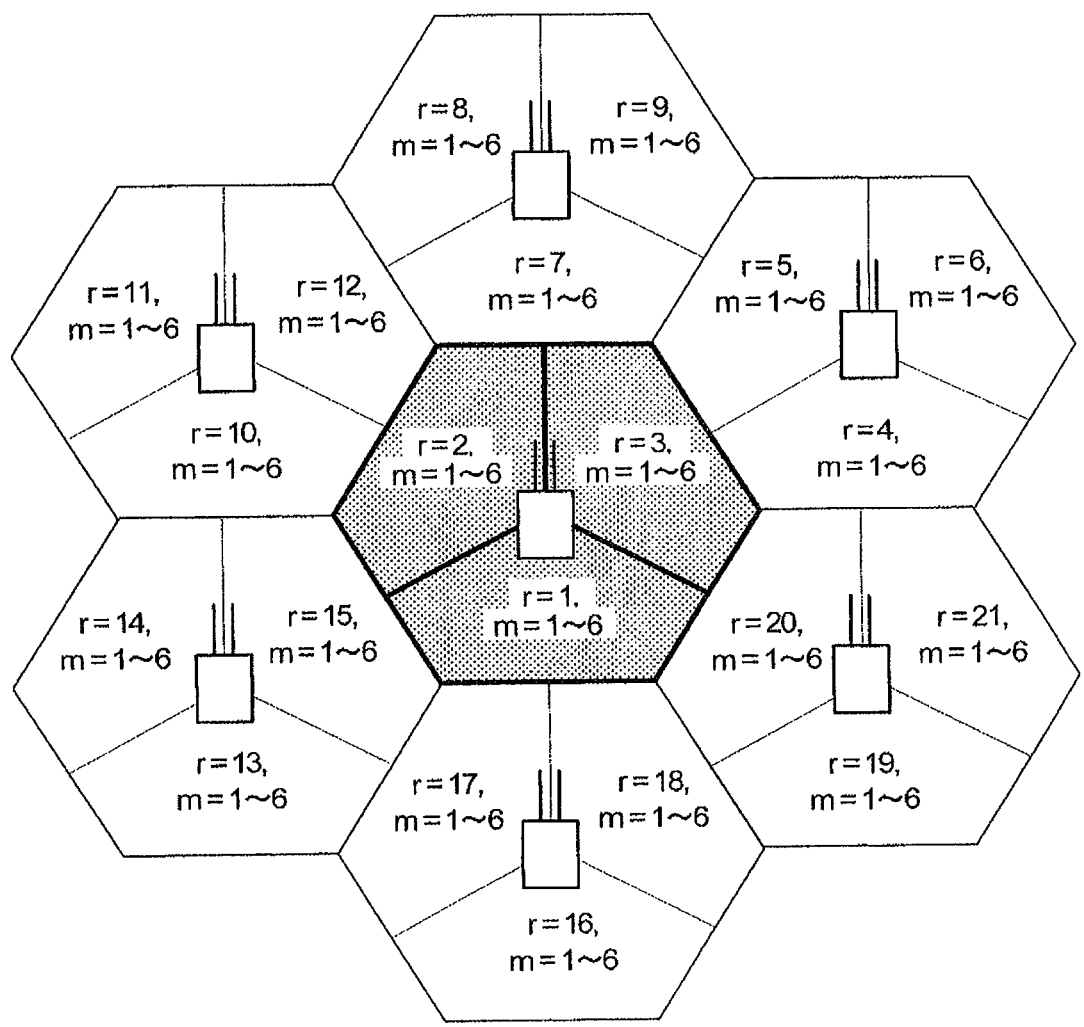
FIG. 1 shows a conventional ZC sequence assignment method.

Now, embodiments of the present invention will be described in detail with reference to the accompanying drawings.

Embodiment 1

In the sequence assignment method according to Embodiment 1 of the present invention, in a case of using ZC sequences for uplink reference signals, R×M sequences specified by the ZC sequence numbers r (r=1 to R) and the cyclic shift sequence numbers m (m=1 to M) are grouped into a plurality of sequence groups as a unit of predetermined number according to transmission bandwidths for reference signals, and ZC sequences are assigned to each cell in the sequence group units. For example, when R×M is twenty and when ten sequence groups are generated, the predetermined number is two. Further, when R×M is sixty and when ten sequence groups are generated, the predetermined number is six.

In the following explanation, R×M sequences specified by the ZC sequence numbers r (r=1 to R) and the cyclic shift sequence numbers m (m=1 to M) are referred to as "virtual sequences" and are specified by virtual sequence number Z. Further, a group formed with these virtual sequences is referred to as a "virtual sequence group" and is specified by virtual sequence group number X.

FIG. 3 (where the predetermined number is six) and FIG. 4 (where the predetermined number is two) show the relationships between the virtual sequence group numbers (X), the ZC sequence numbers r, the cyclic shift sequence numbers m and the virtual sequence numbers Z where the predetermined numbers according to transmission bandwidths for reference signals are six or two, in tables, respectively. A virtual sequence group refers to the group formed with a plurality of different virtual sequences. A virtual sequence group may be formed with virtual sequences of different ZC sequence numbers, but it is preferable to be formed with virtual sequences of the same ZC sequence number from a viewpoint to reduce interference. In the table in FIG. 3, similar to a conventional method, one virtual sequence group is associated with one ZC sequence number, and R is the number of virtual sequence groups in cases where ZC sequence numbers can be used up to R. Meanwhile, in the table in FIG. 4, three virtual sequence groups are associated with one ZC sequence number, so that the number of virtual sequence groups is 3R, and it is learned that the number of virtual sequence groups increases. For example, in cases where transmission bandwidths for reference signals are narrow, it is possible to use the setting of FIG. 4 where the number of virtual sequences is reduced for a narrow band. In other cases, it is possible to use the setting of FIG. 3.

Further, in the table in FIG. 3, one virtual sequence group is associated with one ZC sequence number and cyclic shift sequence numbers 1 to 6. However, one virtual sequence group may be associated with a plurality of ZC sequence numbers and cyclic shift sequence numbers 1 to 6 of each ZC sequence number. That is, virtual sequence group 1 may be associated with cyclic shift sequence numbers 1 to 6 of ZC sequence number 1 and cyclic shift sequence numbers 1 to 6 of ZC sequence number 2. For example, in cases where transmission bandwidths for reference signals are narrower than a threshold value, the table in FIG. 3 may be used, and, meanwhile, in cases where transmission bandwidths for reference signals are wider than a threshold value, the number of virtual sequences included in one virtual sequence group may increase. In cases where transmission bandwidths for reference signals are wide, the number of virtual sequences is large, so that it is possible to maintain the distance between base stations reusing the same sequence to be a distance of little interference between sequences, even when the number of virtual sequences included in one virtual sequence group is increased. Further, in virtual sequence groups, the number of sequences the mobile stations can use increases, so that, by the effect of randomizing the sequence numbers, it is possible to reduce interference within a virtual sequence group or reduce interference between virtual sequence groups.

Figure 5:
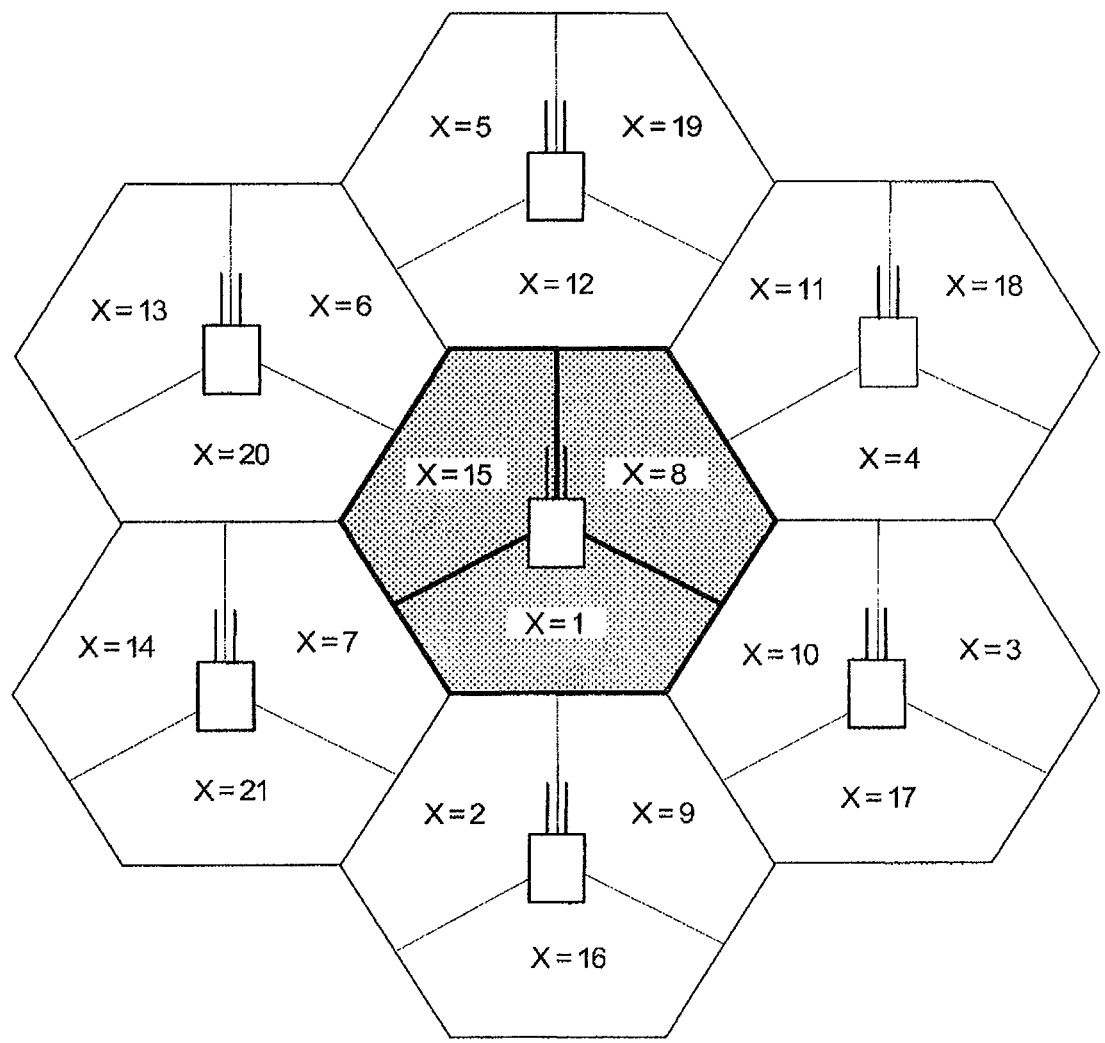
FIG. 5 shows the assignment method according to Embodiment 1.

FIG. 5 shows the method of assigning the virtual sequence groups (the number of virtual sequences: 2) in FIG. 4, to cells. Here, assuming R=9 and M=6, the number of virtual sequences is fifty four kinds. Meanwhile, each virtual sequence group is formed with two virtual sequences, and the number of virtual sequence groups is twenty seven kinds. In the assignment method according to the present embodiment, these twenty seven kinds of virtual sequence groups are assigned to cells. In a conventional assignment method, nine kinds need to be assigned to cells.

Now, an example of methods of determining the number of virtual sequences included in each virtual sequence group will be explained.

In uplink data transmission, the minimum unit of transmission bandwidth is determined, and the mobile station transmits data using the minimum unit of bandwidth or a plurality of minimum units bandwidths.

Consequently, when the transmission bandwidth for reference signals is wide, there may be a large number of mobile stations transmitting data in the bandwidth. At this time, it is necessary to multiplex reference signals in the same transmission bandwidth for channel estimation of the mobile stations. For example, in cases where a transmission band for reference signals are 1.25 MHz, if the minimum transmission bandwidth for data transmission is 375 kHz, reference signals of three mobile stations need to be multiplexed. The example here presumes that all mobile stations transmitting data transmit reference signals. However, assuming that two kinds of virtual sequences included in a virtual sequence group are assigned, it is difficult to multiplex reference signals from three mobile stations in the same transmission bandwidth. Consequently, in cases where transmission bandwidth is wide, it is necessary to set the larger number of virtual sequences assigned to one cell.

On the other hand, when the transmission bandwidth for reference signals is narrow, it is less likely to be a large number of mobile stations transmitting data in the bandwidth, and therefore it is less likely to have to multiplex a large number of reference signals. If the transmission band for reference signals is 375 kHz, a reference signal of one mobile station alone may be transmitted. In this way, the number of virtual sequences required to be assigned to one cell varies depending on a transmission bandwidth for reference signals and the minimum transmission bandwidth of data. Then, the virtual sequences are grouped into a plurality of virtual sequence groups according to transmission bandwidths.

As explained above, when the transmission bandwidth for reference signals is narrow, it is possible to reduce the number of virtual sequences included in a virtual sequence group and increase the number of virtual sequence groups.

Increasing and decreasing the number of virtual sequence groups by changing the predetermined number is very preferable in view of the fact that the number of cyclic shift sequences varies according to the sequence length N. For example, in a conventional assignment method, the distance between base stations reusing the same sequence is longer when the band is broader, and inter-cell interference decreases between the same sequences. However, if the bandwidth exceeds a certain extent, the distance between base stations is long enough, so that inter-cell interference between the same sequences little occurs, and the inter-cell interference between the same sequences little decreases even if the bandwidth is wider.

On the other hand, in the assignment method according to the present embodiment, the number of virtual sequences assigned to one cell is set to the necessary predetermined number according to the bandwidths, so that lower flexibility in assignment due to decrease of the number of ZC sequences can be compensated for, thereby enabling assignment with suppressed interference. For example, by increasing the number of virtual sequences included in one virtual sequence group in broadband, the number of virtual sequences the mobile stations can use increases and the mobile stations can change virtual sequences used in a given interval, so that, by the effect of randomizing sequences, it is possible to reduce interference in a virtual sequence group or between virtual sequence groups. Further, it is possible to reduce inter-sequence interference between a virtual sequence group of a wide bandwidth and virtual sequence group of a narrow bandwidth. The distance between base stations reusing the same sequences can be maintained in more than a given distant, so that it is possible to suppress inter-cell interference low because of the same sequence.

Figure 6:
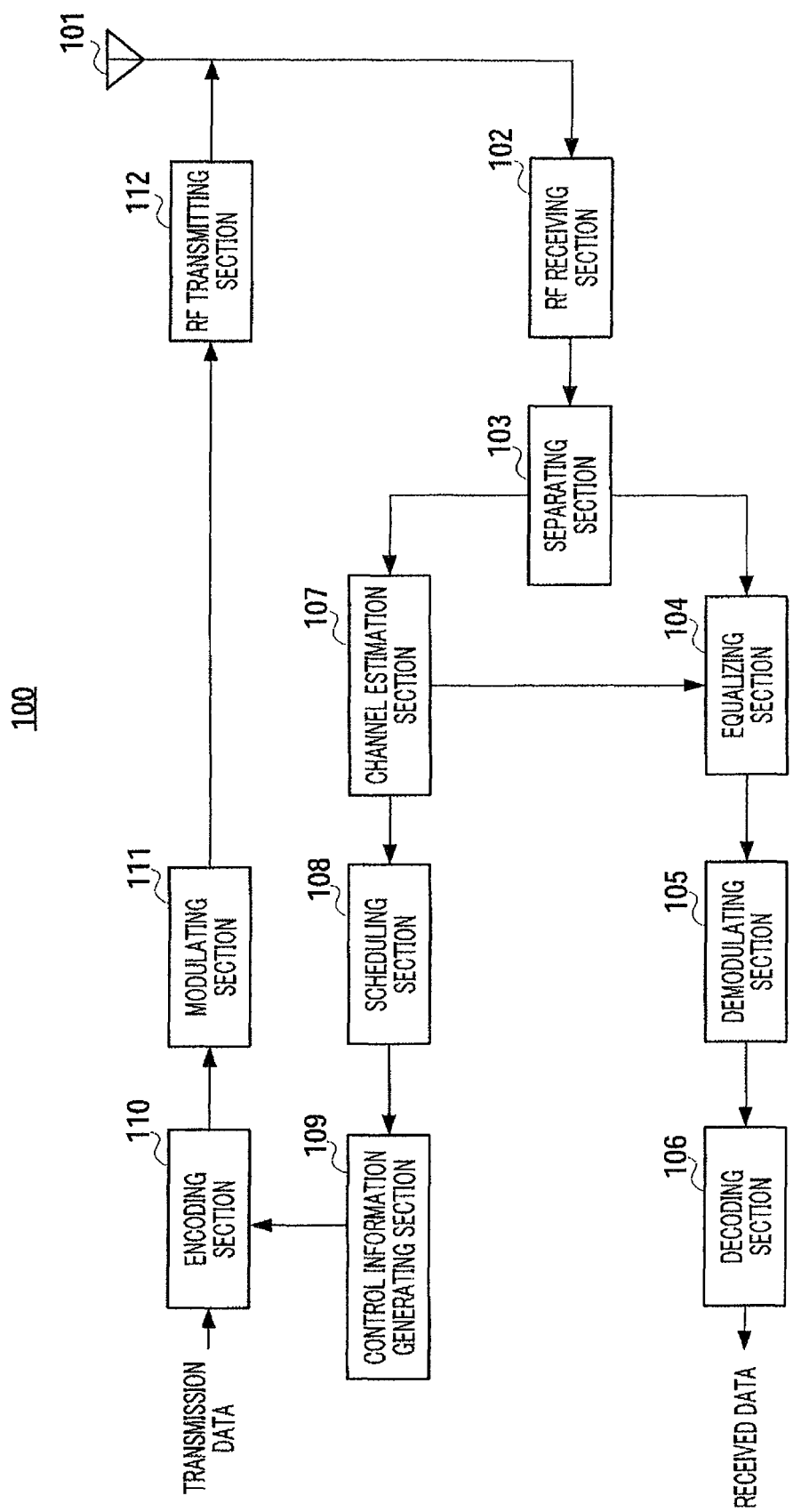
FIG. 6 shows a block diagram showing the configuration of the base station according to Embodiment 1.

Next, FIG. 6 shows base station 100 according to the present embodiment.

In base station 100, transmission data and control information are encoded in encoding section 110, modulated in modulating section 111, subjected to transmission processing including D/A conversion, amplification and up-conversion in RF transmitting section 112 and transmitted to mobile stations from antenna 101.

RF receiving section 102 performs receiving processing including down-conversion and A/D conversion on signals received from mobile stations via antenna 101, and outputs the signals to separating section 103.

Separating section 103 separates a signal received as input to a reference signal, a data signal and a control signal, and outputs the data signal and the control signal to equalizing section 104 and the reference signal to channel estimating section 107.

Equalizing section 104 equalizes the data signal and the control signal using channel fluctuation estimated in channel estimation section 107, and outputs the signals after equalization processing to demodulating section 105.

Demodulating section 105 demodulates the data signal and control signal, and outputs the signals to decoding section 106.

Decoding section 106 decodes the signal received as input after demodulation, to acquire received data.

Channel estimation section 107 measures uplink channel characteristics from the reference signal received as input using the ZC sequence number and cyclic shift sequence number associated with the virtual sequence group number of the cell belonging to base station 100 ("local cell"), and outputs the measurement result to scheduling section 108 and equalizing section 104.

Scheduling section 108 performs scheduling based on the measurement result received as input. Further, scheduling section 108 assigns the ZC sequence number and cyclic shift sequence number associated with the virtual sequence group number of the local cell to the reference signal of each mobile station.

Control information generating section 109 generates control information using the above assignment method.

Figure 7:
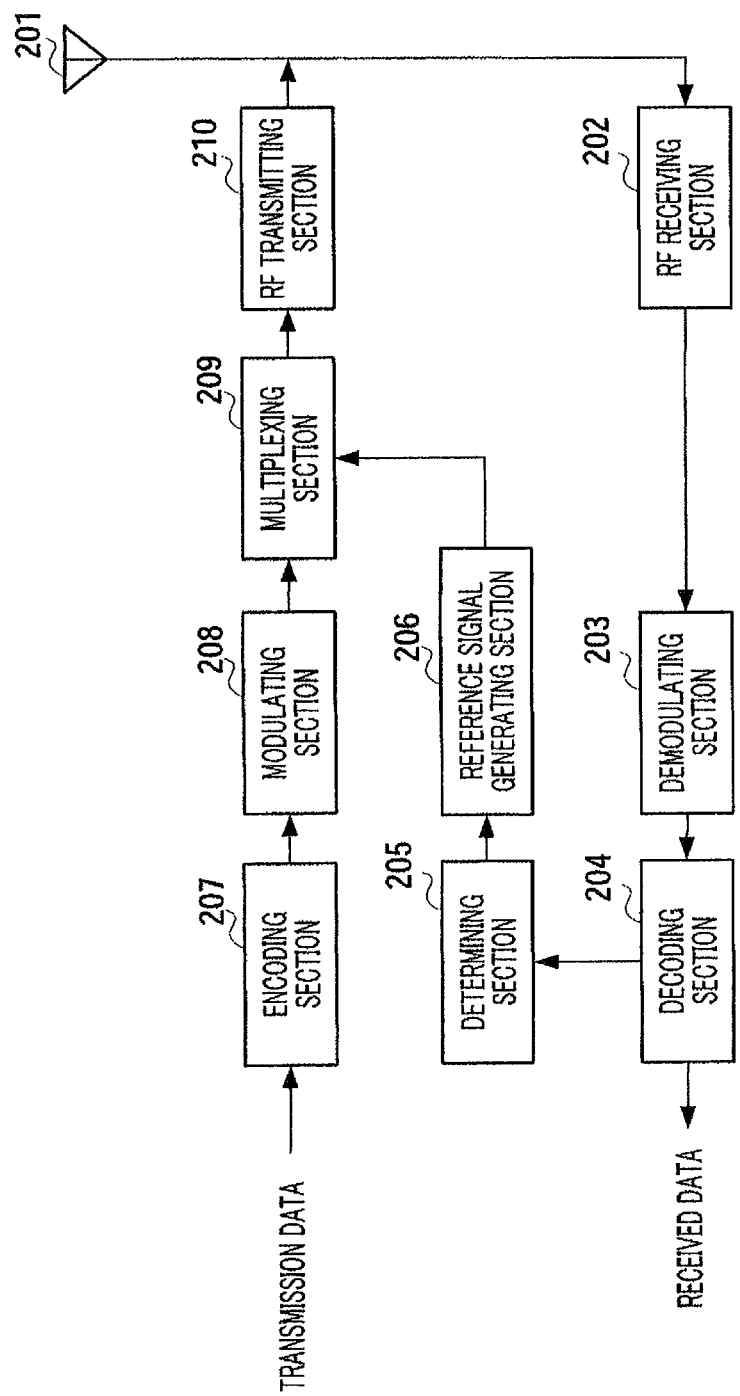
FIG. 7 shows a block diagram showing the configuration of the mobile station according to Embodiment 1.

Next, FIG. 7 shows the configuration of mobile station 200 according to the present embodiment.

Mobile station 200 has: determining section 205 for determining the ZC sequence number and cyclic shift sequence number assigned to the mobile station based on the control information transmitted from base station 100; and reference signal generating section 206 for generating a reference signal according to the ZC sequence number and cyclic shift sequence number assigned to the mobile station.

RF receiving section 202 performs receiving processing including down-conversion and A/D conversion on the signal received from base station 100 via antenna 201, and outputs the signal to demodulating section 203.

Demodulating section 203 demodulates the signal received as input from RF receiving section, and outputs the demodulated signal to decoding section 204.

Decoding section 204 decodes the signal after demodulation, to acquire data signal and control information. The control information related to the reference signal is outputted to determining section 205.

Determining section 205 determines the ZC sequence number and cyclic shift sequence number assigned to the mobile station, and outputs the determination result to reference signal generating section 206.

Reference signal generating section 206 generates a reference signal based on the ZC sequence number and cyclic shift sequence number inputted from determining section 205, and outputs the reference signal to multiplexing section 209.

On the other hand, transmission data is encoded in encoding section 207 and modulated in modulating section 208, and outputted to multiplexing section 209.

Multiplexing section 209 time-multiplexes transmission data and reference signal received as input, and outputs the time-multiplexed signal to RF transmitting section 210.

RF transmitting section 210 performs transmission processing including D/A conversion, amplification and up-conversion on the reference signal and data symbol, and transmits the reference signal and data symbol after transmission processing to base station 100 from antenna 201.

In this way, according to the present embodiment, by setting the number of virtual sequences included in a virtual sequence group according to transmission bandwidths for reference signals, it is possible to increase the number of virtual sequence groups upon narrowband transmission. For this reason, even when a reference signal is transmitted in a narrowband, a virtual sequence group assigned to a cell can be determined from a large number of virtual sequence groups, so that it is possible to reduce inter-cell interference with reference signals. Further, in a broadband, by increasing the number of virtual sequences included in one virtual sequence group, it is possible to reduce inter-cell interference with the reference signals by the randomization effect.

Embodiment 2

Figure 8:
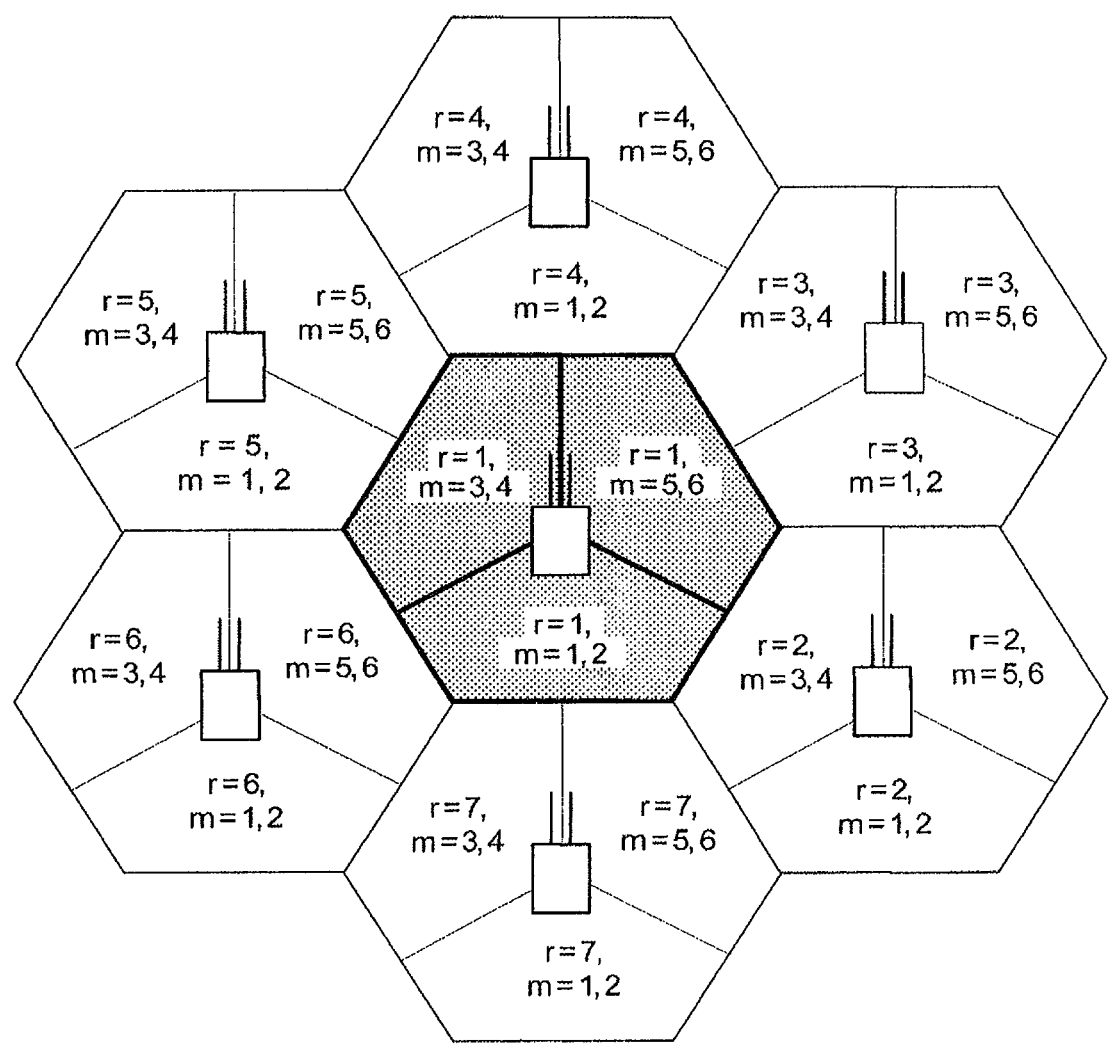
FIG. 8 shows the assignment method according to Embodiment 2.

In the present embodiment, in cases where virtual sequence groups are grouped such that each virtual sequence group is formed with virtual sequences of the same ZC sequence number as shown in the table in FIG. 4, virtual sequence groups of the same ZC sequence are preferentially assigned to cells belonging to the same base station. That is, in a case of using the table in FIG. 4, virtual sequence groups (X), that is, X1=3k, X2=3k+1 and X3=3k+2, are preferentially assigned to cells belonging to one base station. In this way, the common ZC sequence number is preferentially used in a plurality of cells belonging to the same base station, and different cyclic shift sequences are used between cells in the same base station. FIG. 8 shows the method of assigning this virtual sequence group (the number of virtual sequences: 2) to cells. Referring to FIG. 8, the ZC sequences of the same sequence number r (e.g., r=1) are used in the cells belonging to the same base station (e.g., three cells in a shaded part in FIG. 8). Then, in the cells of the same base station different cyclic shift sequences m are used. That is, m=1, 2 are used in cell #1, m=3, 4 are used in cell #2, m=5 and 6 are used in cell #3.

Figure 2:
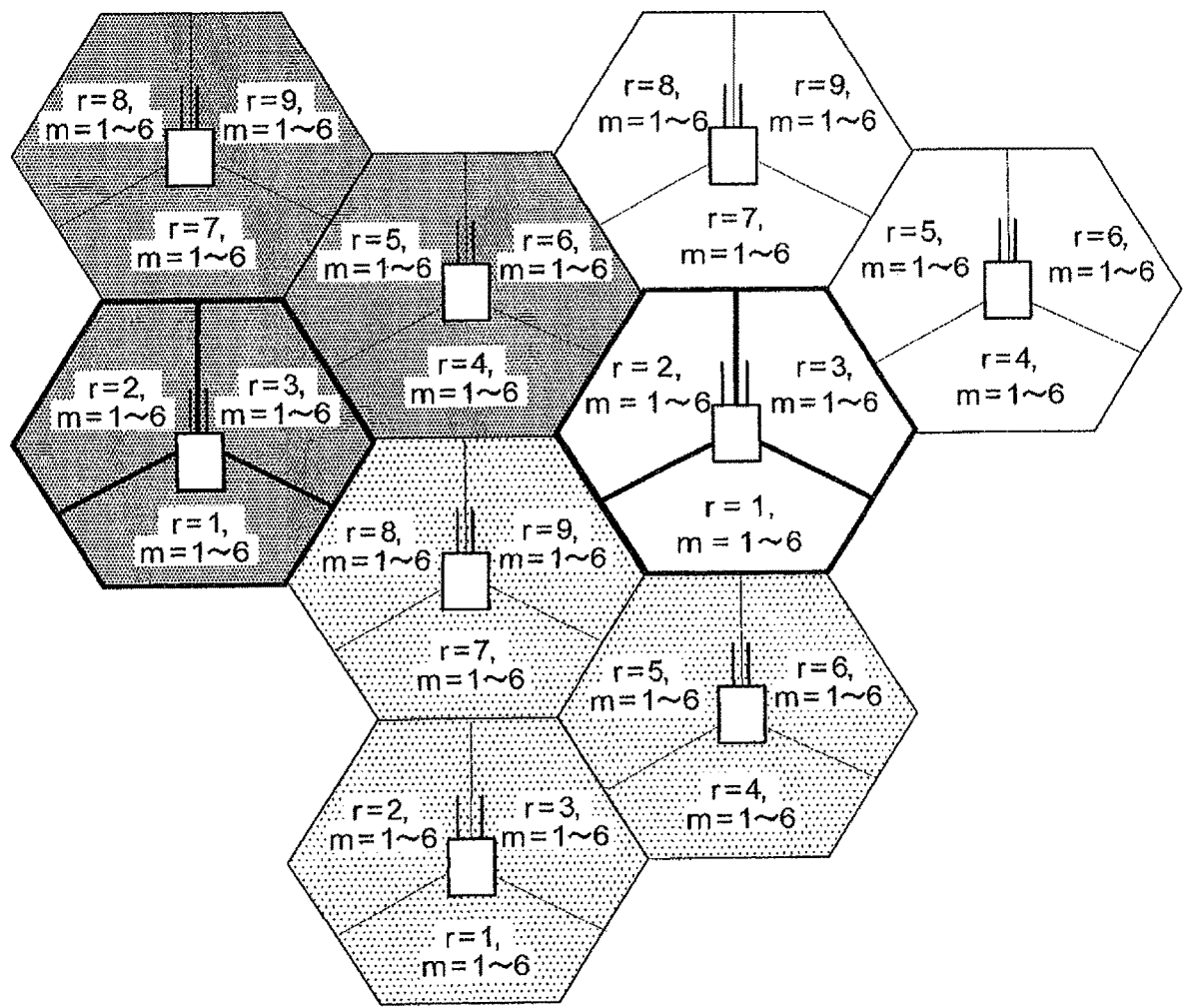
FIG. 2 shows a conventional assignment pattern.
Figure 9:
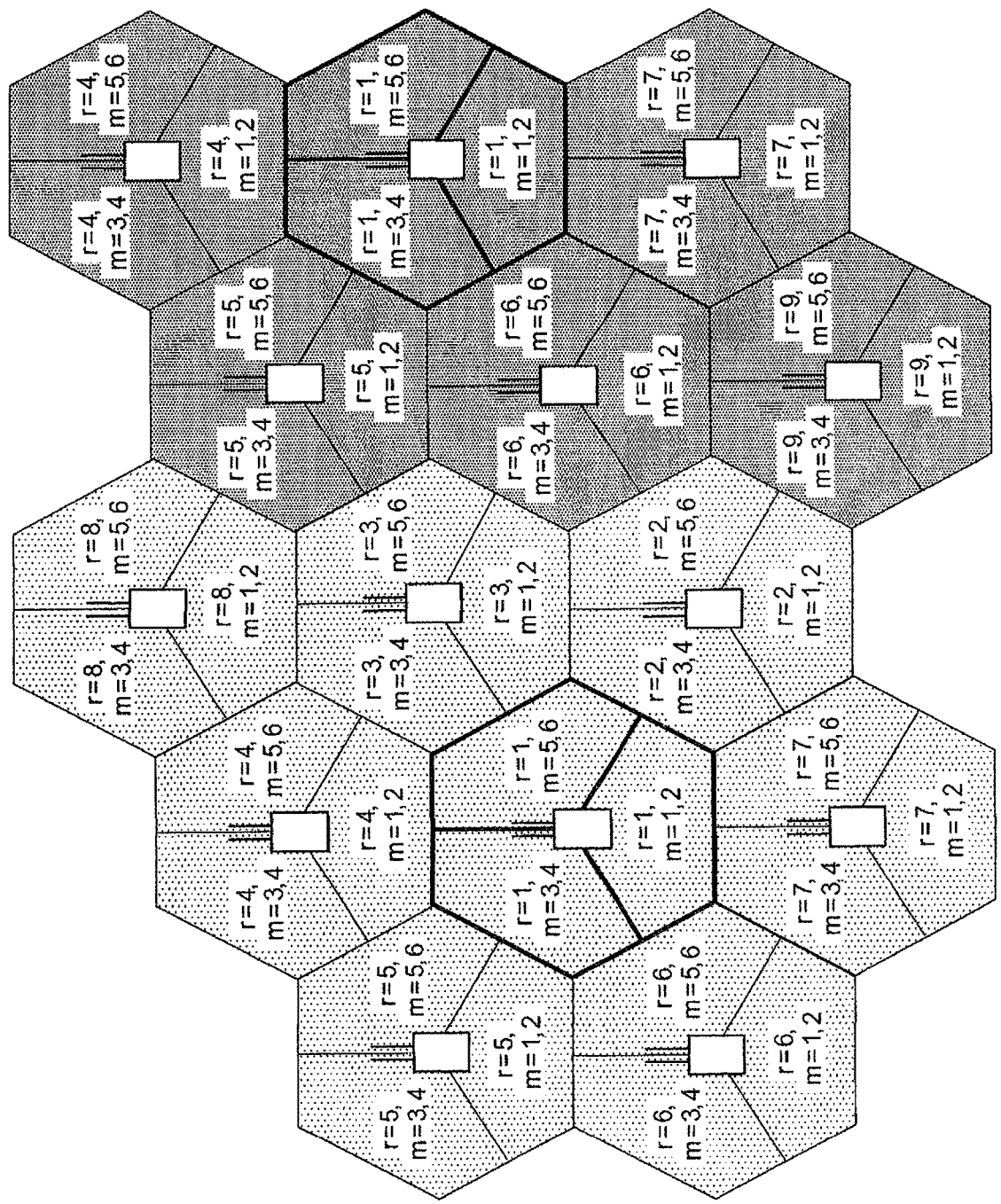
FIG. 9 shows the assignment pattern according to Embodiment 2.

Next, FIG. 9 shows assignment patterns to cells in the assignment method according to the present embodiment. The number of ZC sequences is nine. As apparent from this assignment method compared to the conventional assignment method shown in FIG. 2, according to the present embodiment, the distance between a plurality of base stations using the same ZC sequence can be longer than in a conventional case. Consequently, it is possible to decrease inter-cell interference between different base stations using the same ZC sequence.

Figure 10:
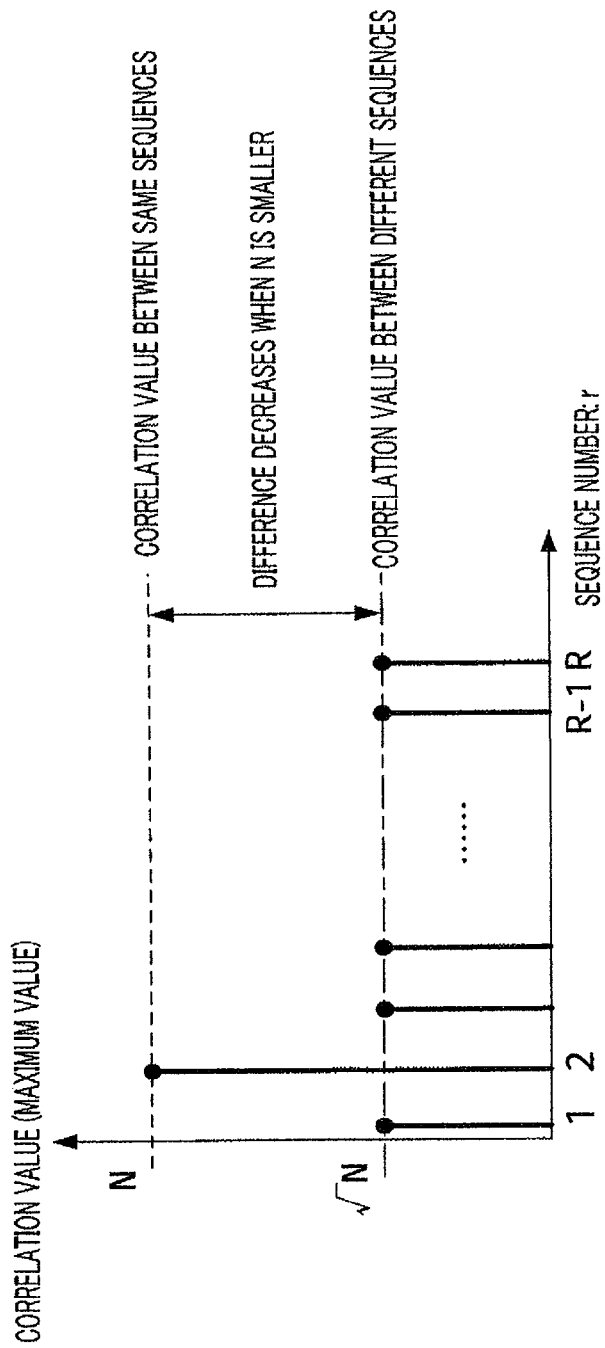
FIG. 10 illustrates cross-correlation characteristics of a ZC sequence according to Embodiment 2.

Further, it is possible to reduce interference between cells belonging to the same base station. If sequence length N is a prime number, the maximum value of correlation between different sequences is $\sqrt{N}$ and fixed. On the other hand, if the sequences are the same, the maximum value of correlation is N. FIG. 10 shows the correlation characteristics between sequences of these ZC sequences (in the case of r=2). At this time, the difference between a correlation value between different ZC sequences and a correlation value between the same ZC sequences decreases when the sequence length N is shorter. Consequently, in a conventional method, even when ZC sequences of different sequence numbers are used between neighboring cells, effect of suppressing inter-cell interference with reference signals decreases when the sequence length N is shorter. By contrast with this, according to the present embodiment, in the cells that establish frame timing synchronization and that belong to the same base station, delay spread is determined so as not to exceed the amount of cyclic shift Δ, so that it is possible to reduce interference by using cyclic shift sequences orthogonal to each other at the interval Δ, and consequently, it is possible to reduce interference between cells belonging to the same base station.

Although establishing synchronization with frame timings (i.e., uplink and downlink transmission or reception timing) between cells belonging to different base stations is difficult, establishing synchronization with frame timings between cells belonging to the same base station is relatively easy. For the reason, it is relatively easy to perform multiplexing by cyclic shift sequences between cells belonging to the same base station.

Further, in a communication system where synchronization with frame timings is established between cells belonging to different base stations (i.e., synchronization system between base stations), the cells where a virtual sequence group of the same ZC sequence is preferentially assigned is not limited to the cells belonging to the same base station, and may be neighboring cells. Even if this sequence assignment is performed, it is possible to reduce inter-cell interference with received signals.

Embodiment 3

In the present embodiment, in cases where the number of virtual sequences included in a virtual sequence group of Embodiment 2 decreases, the cyclic shift sequence numbers m to be assigned to cells are discontinuous numbers. That is, assignment is given to cells at an interval of cyclic shift sequence numbers m.

Figure 11:
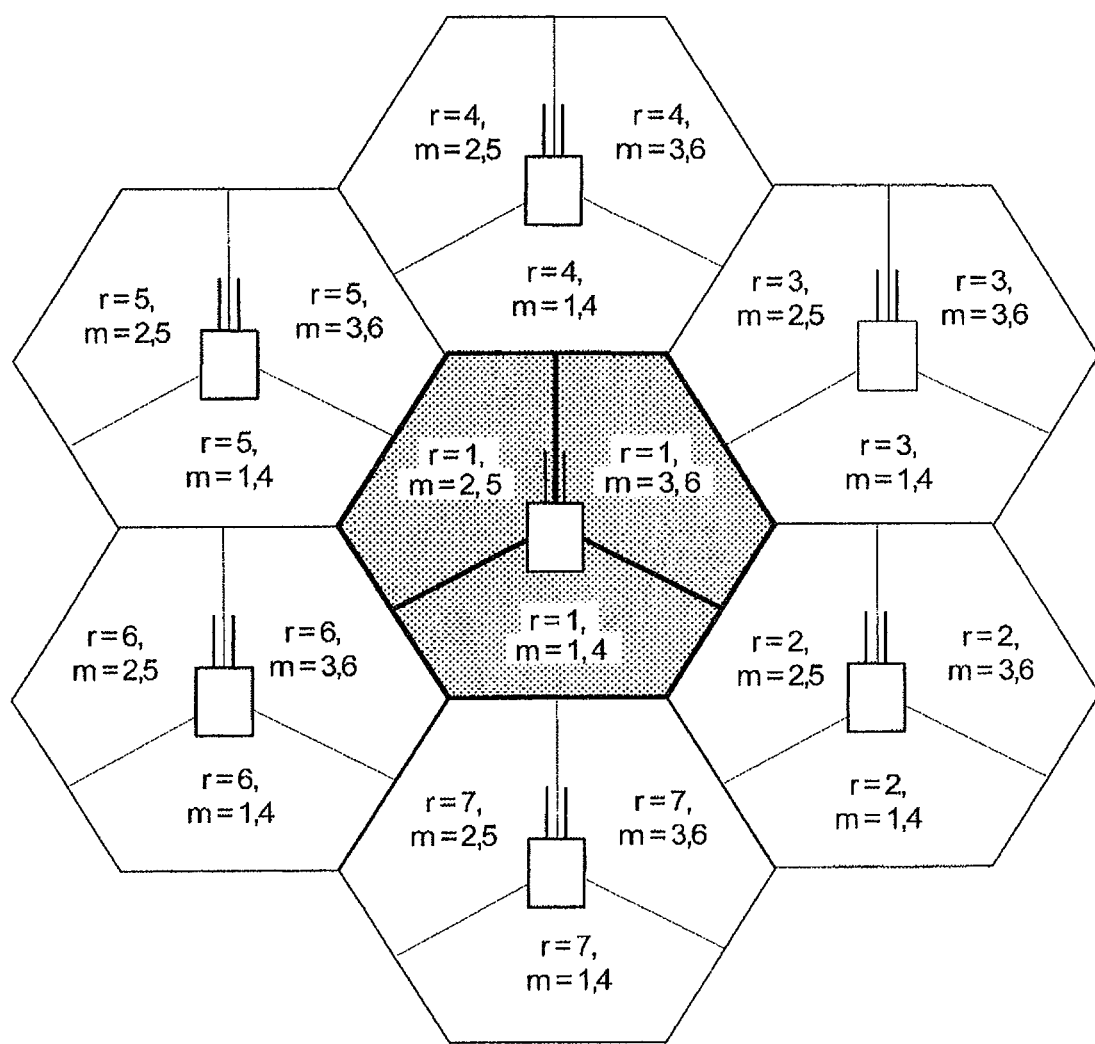
FIG. 11 shows the assignment method according to Embodiment 3.

FIG. 11 shows an example of the assignment method according to Embodiment 3. In FIG. 11, cyclic shift sequence numbers m=1, 4 are assigned in cell #1, m=2, 5 are assigned in cell #2, m=3 and 6 are assigned in cell #3. Although, in FIG. 11, the same ZC sequence number is used in three cells belonging to the same base station, the present embodiment is not limited to this.

In this way, according to the present embodiment, each virtual sequence group is formed with virtual sequences, which are virtual sequences of the same ZC sequence number and which are virtual sequences of discontinuous numbers. Accordingly, it is possible to reduce interference by the delay wave exceeding the amount of cyclic shift transmitted from the same cell. When the reference signal of cyclic shift sequence number m=2 is the delayed wave exceeding the amount of cyclic shift Δ, in the base station, the reference signal is detected in error as cyclic shift sequence number m=1. Further, this error detection interferes with cyclic shift sequence number m=1. However, according to the present embodiment, for example, only the ZC sequences of cyclic shift sequence numbers m=2, 5 are used in one cell, so that, even when these ZC sequences are received as ZC sequences of cyclic shift sequence number m=1 in the base station, the reference signal is not detected in error. That is, according to the present embodiment, it is possible to reduce interference between reference signals in one cell.

Embodiment 4

In the present embodiment, in cases where the number of virtual sequences included in a virtual sequence group of Embodiment 2 decreases, cyclic shift sequence numbers are reused between cells belonging to the same base station. That is, in the cells belonging to the same base station, different cyclic shift numbers are used between neighboring cells, and cyclic shift sequence numbers are reused between cells that are not neighboring each other.

Figure 12:
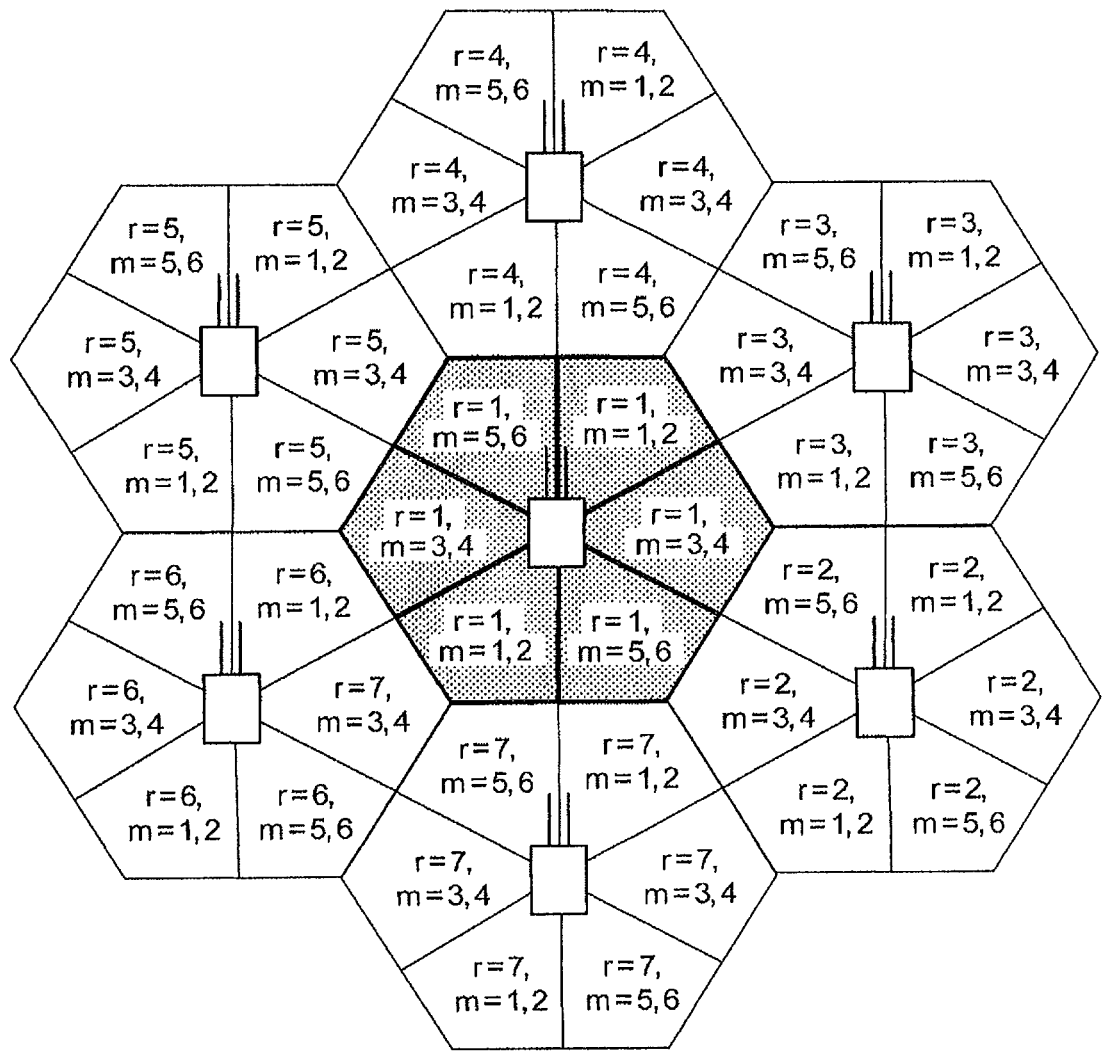
FIG. 12 shows the assignment method according to Embodiment 4.

FIG. 12 shows an example of assignment method according to Embodiment 4. In FIG. 12, it is assumed that there are six cells belonging to the same base station, and the same ZC sequence is used in the cells (e.g., the six cells in shaded parts in FIG. 12). In the example shown in FIG. 12, cyclic shift sequence numbers m are reused between cells in the same base station, like m=1, 2 in cells #1 and #4, m=3, 4 in cells #2 and #5, m=5, 6 in cell #3 and #6.

Consequently, according to the present embodiment, cyclic shift sequence numbers are reused between cells in the same base station, so that, even when the number of cells increases, it is possible to make longer the distance between base stations using the same sequence number and reduce inter-cell interference. The same cyclic shift sequence numbers m are not used in neighboring cells, so that influence of inter-cell interference between cells is little.

The embodiments of the present invention have been explained.

In all the embodiments explained above, it is possible to reduce the amount of report signaling. For example, assuming that cyclic shift sequence numbers m=1 to 6, six kinds (m=1 to 6) of the cyclic shift sequences are used in a conventional case. However, in the present invention, two kinds of the cyclic shift sequences are used (for example, m=1, 2 in cell #1, m=3, 4 in cell #2, and m=5, 6 in cell #3).

For this reason, in a conventional method, the base station selects a cyclic shift sequence number from six kinds (m=1 to 6) and reports it to the mobile stations. That is, as a report of cyclic shift sequence number to mobile stations, it is necessary to provide three bits for each mobile station.

By contrast with this, in the present invention, the base station may select a cyclic shift sequence number from two kinds and report it to the mobile stations. The cyclic shift sequence numbers are limited to two kinds, for example, cyclic shift sequence numbers 1 and 2 in cell #1, cyclic shift sequence numbers 3, 4 in cell #2, cyclic shift sequence numbers 5, 6 in cell #3. That is, when the present invention is implemented, as a report of cyclic shift sequence number for each mobile station, one bit may be provided for each mobile station.

Meanwhile, the mobile station estimates a cyclic shift sequence number assigned to the cell where the mobile station belongs, from one-bit report information transmitted from the base station. For example, when one-bit report information (for example, 1) is reported, the mobile station located in cell #1 (cyclic shift sequence m=1, 2) can determine m=1, the mobile station located in cell #2 (cyclic shift sequence m=3, 4) can determine m=3, and the mobile station located in cell #3 (cyclic shift sequence m=5, 6) can determine m=5. In this way, according to the present invention, it is possible to reduce the amount of report signaling.

Further, although the present invention is especially effective in cases where transmission bandwidth for a reference signal is narrow, the present invention is not limited to this.

Further, the predetermined number may be changed such that the number of virtual sequence groups are the same between transmission bandwidths for reference signals. That is, when twenty virtual sequence groups are generated in each transmission bandwidth, the predetermined number may be set according to the number of the groups.

Further, it is effective that the base station and the mobile station share information of virtual sequence groups and virtual sequence numbers. For example, the base station and the mobile station may share a table showing the relationships between virtual sequence groups and virtual sequence numbers.

Further, all numbers in virtual sequence numbers may not be included in a virtual sequence group. That is, there may be virtual sequence numbers unused.

Further, in the above explanation, cells in the same base station have been explained as an example. However, they may also be the cells where frame synchronization is established.

Further, the present invention may be applied to a part of transmission bandwidth instead of all transmission bandwidth.

Further, although cases have been explained above where the number of virtual sequences included in a virtual sequence group is two kinds, the present invention is not limited to this.

Further, cases have been explained above presuming that each virtual sequence group is assigned to a cell. However, it may be presumed that each virtual sequence group is assigned to a base station. For example, virtual sequence group 1 of FIG. 3 may be assigned to the base station, and the base station may allocate virtual sequence numbers 1 to 6 included in virtual sequence group 1 to the cells or mobile stations.

Further, generally, the sequence length is longer when transmission bandwidths are wider, and therefore, setting the number of virtual sequences included in a virtual sequence group according to the transmission bandwidths for reference signals equals setting the number of virtual sequences included in a virtual sequence group according to the sequence length of a reference signal.

Further, although cases have been explained using ZC sequences, the present invention may be applied to CAZAC sequences, ZC sequences with even lengths, GCL sequences, Frank sequences, PN sequences such as M sequences and gold sequences, sequences that CAZAC sequences are truncated or extended, sequences that CAZAC sequences are punctured, Random CAZAC sequences, OLZC sequences, RAZAC sequences and other sequences generated by a computer.

Further, a base station in the above embodiments may be referred to as "Node-B," and a mobile station may be referred to as "UE."

Moreover, although with the above embodiment a case has been described where the present invention is configured by hardware, the present invention may be implemented by software.

Each function block employed in the explanation of the aforementioned embodiment may typically be implemented as an LSI constituted by an integrated circuit. These may be individual chips or partially or totally contained on a single chip. "LSI" is adopted here but this may also be referred to as "IC," "system LSI," "super LSI" or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2006-271051, filed on Oct. 2, 2006, including the specification, drawings and abstract, is incorporated herein by reference in its entirety.

INDUSTRIAL APPLICABILITY

The present invention is applicable to, for example, mobile communication systems.

The invention claimed is:

1. An integrated circuit, comprising:
receiving circuitry, which, in operation, controls reception of control information related to a sequence, the sequence being within one of a first group or a second group, the first group being divided into first subgroups each including a first number of one or more first sequences, the second group being divided into second subgroups each including a second number of one or more second sequences, the first sequences and the second sequences having different lengths, and the first number being different from the second number; and
transmitting circuitry, which, in operation, controls transmission of a reference signal using the sequence based on the control information.

2. The integrated circuit according to claim 1, comprising:
at least one input, wherein the at least one input, in operation, inputs data; and
at least one output, wherein the at least one output, in operation, outputs data.

3. The integrated circuit according to claim 1, wherein each of the first subgroups includes the same first number of the one or more first sequences, and each of the second subgroups includes the same second number of the one or more second sequences.

4. The integrated circuit according to claim 1, wherein a length of the first sequences is greater than a length of the second sequences, and the first number of the one or more first sequences in a first subgroup is greater than the second number of the one or more second sequences in a second subgroup.

5. The integrated circuit according to claim 1, wherein the control information is related to one of the first subgroups or one of the second subgroups.

6. The integrated circuit according to claim 1, wherein one of the first subgroups or one of the second subgroups is assigned to a device depending on a cell.

7. The integrated circuit according to claim 1, wherein the first sequences and the second sequences are Zadoff-Chu sequences.

8. The integrated circuit according to claim 1, wherein control information identifies the sequence within one of the first group or the second group.

9. The integrated circuit according to claim 1, wherein the control information identifies one of the first subgroups or one of the second subgroups.

10. The integrated circuit according to claim 1, wherein the first sequences and the second sequences include cyclically shifted sequences derived from sequences according to different cyclic shift values.

11. The integrated circuit according to claim 1, wherein a number of the first subgroups equals a number of the second subgroups.

12. An integrated circuit comprising circuitry, which, in operation:
controls reception of control information related to a sequence, the sequence being within one of a first group or a second group, the first group being divided into first subgroups each including a first number of one or more first sequences, the second group being divided into second subgroups each including a second number of one or more second sequences, the first sequences and the second sequences having different lengths, and the first number being different from the second number; and
controls transmission of a reference signal using the sequence based on the control information.

13. The integrated circuit according to claim 12, comprising:
at least one input coupled to the circuitry, wherein the at least one input, in operation, inputs data; and
at least one output coupled to the circuitry, wherein the at least one output, in operation, outputs data.

14. The integrated circuit according to claim 12, wherein each of the first subgroups includes the same first number of the one or more first sequences, and each of the second subgroups includes the same second number of the one or more second sequences.

15. The integrated circuit according to claim 12, wherein a length of the first sequences is greater than a length of the second sequences, and the first number of the one or more first sequences in a first subgroup is greater than the second number of the one or more second sequences in a second subgroup.

16. The integrated circuit according to claim 12, wherein the control information is related to one of the first subgroups or one of the second subgroups.

17. The integrated circuit according to claim 12, wherein one of the first subgroups or one of the second subgroups is assigned to a device depending on a cell.

18. The integrated circuit according to claim 12, wherein the first sequences and the second sequences are Zadoff-Chu sequences.

19. The integrated circuit according to claim 12, wherein the control information identifies the sequence within one of the first group or the second group.

20. The integrated circuit according to claim 12, wherein the control information identifies one of the first subgroups or one of the second subgroups.

21. The integrated circuit according to claim 12, wherein the first sequences and the second sequences include cyclically shifted sequences derived from sequences according to different cyclic shift values.

22. The integrated circuit according to claim 12, wherein a number of the first subgroups equals a number of the second subgroups.

* * * * *